(12) United States Patent
Clampitt

(10) Patent No.: US 6,516,619 B2
(45) Date of Patent: Feb. 11, 2003

(54) METHOD OF STORING A GAS

(75) Inventor: Roy Clampitt, c/o Oxford Applied Research Limited, Crawley Mill, Witney, Oxfordshire (GB), OX8 5TJ

(73) Assignee: Roy Clampitt, Charlbury (GB)

( * ) Notice: Subject to any disclaimer, the term of this patent is extended or adjusted under 35 U.S.C. 154(b) by 0 days.

(21) Appl. No.: 09/816,776

(22) Filed: Mar. 26, 2001

(65) Prior Publication Data

US 2001/0037647 A1 Nov. 8, 2001

(30) Foreign Application Priority Data

Mar. 25, 2000 (GB) .............................................. 0007214

(51) Int. Cl.⁷ ................................................ F17C 11/00
(52) U.S. Cl. ........................................................ 62/46.3
(58) Field of Search ................................ 62/46.1, 46.3, 62/59

(56) References Cited

U.S. PATENT DOCUMENTS 4,414,005 A   11/1983   De Biévre et al.
5,536,893 A    7/1996   Gudmundsson

FOREIGN PATENT DOCUMENTS

EP    0 787 941 A2      8/1997
WO    WO 00/01980    *  1/2000    ........... F17C/11/00

* cited by examiner

Primary Examiner—William C. Doerrler
Assistant Examiner—Malik N. Drake
(74) Attorney, Agent, or Firm—Arent Fox Kintner Plotkin & Kahn, PLLC

(57) ABSTRACT

A method of storing a gas comprises absorbing a gas into or onto an absorbent medium, in one example by cryosorbing the gas. The cryosorbed gas is then encapsulated. Encapsulating the cryosorbed gas increases the temperature at which the absorbent medium can be kept before the cryosorbed gas is released.

The encapsulation layer can be provided by freezing a material that has a lower vapour pressure than the gas. One suitable material for forming the encapsulation layer in this way is water. This method can be used to store gases having a very low boiling point, such as hydrogen or oxygen

15 Claims, 1 Drawing Sheet

METHOD OF STORING A GAS

FIELD OF THE INVENTION

The present invention relates to a method of storing a gas, in particular to a method of storing a gas that has a freezing point that is substantially below 0° C.

The term "gas" as used in this specification refers to a substance that is gaseous under conditions of room temperature and atmospheric pressure.

BACKGROUND OF THE INVENTION

There is currently considerable interest in replacing petrol (known as "gasoline" in some countries) and related petrochemical fuels with fuels that produce less pollution. Substances that are being considered for use as an alternative fuel for, for example, vehicle propulsion include methanol and hydrogen. This worldwide research activity in alternative fuels is generally known as "the hydrogen economy".

One factor that is important in the commercial acceptance of an alternative fuel is the ease of storing the fuel. Petrol is a liquid at normal ambient temperatures, and so is easy to store and transport. Of the two alternative fuels mentioned above, methanol is a liquid at room temperature (melting point −98° C., boiling point 65° C.), but hydrogen is a gas at room temperature (melting point −259° C., boiling point −252° C.). In order for hydrogen to be widely used as a fuel, one problem that must be overcome is to find a convenient way of storing hydrogen. Various methods of storing hydrogen are currently being explored, such as storing hydrogen as a liquid, as a high-pressure gas, as a metal hydride, and storing by cryosorption. The present invention relates to a cryosorption method of storing hydrogen or other gases.

It is well known that hydrogen, and other can be physisorbed into be microscopic pores of materials such as zeolites (alumino-silicates) and "activated" carbons. Materials suitable for physisorbing gases are commercially available The physisorption cm be achieved at room temperature by high pressure absorption, but it can more effectively be carried Out by physisorption at cryogenic temperatures.

The use of carbon to store hydrogen cryogenically in this manner is disclosed in, for example, U.S. Pat. No. 4,716, 736, by Amnkwah et in "Int J of Hydrogen Energy" Vol 14, pp 437 (1989), and by Carpetis et al in "Int J of Hydrogen Energy" Vol 5, pp 539 (1980). The temperature at which storage is found to be cable is variously reported to be between 4° K and 15° K (0° C.=273° K), and the stored hydrogen is released for use by a controlled increase in the temperature of the absorbent material.

It will be appreciated that this method of storing hydrogen that the absorbent material is kept at a temperature of 15° K (−123° C.) or below, and it is expensive and inconvenient to do this. In order to make a cryosorption method of storing gas more economically attractive it is desirable to raise the temperature at which the hydrogen can be stored.

In the early development of vacuum pumps it was discovered that mates such as the abovementioned zeolites and activated carbon could aid the evacuation of air from a vessel by the phenomenon of "cryopumping". Pumps that operate on the basis of this phenomenon are now commercially available, and are known as "cryopumps". It was noted during these early developments that when a vapour such as water is condensed it is possible that another gas could be within the condensed vapour. This phenomenon is known as cryotrapping. For example, the cryotrapping of nitrogen gas and argon gas in condensed water vapour is reported by Schmidlin in "Transactions of 9th American Vacuum Symposium" pp197 (1962), MacMillan N.Y. Hengevoss et al have reported, in "Transactions of 10th American Vacuum Symposium" pp101 (1963) MacMillan N.Y., the cryotrapping of argon in condensed water vapour. The present inventor has also demonstrated cryotrapping of hydrogen and argon simultaneously when water vapour is condensed as ice under vacuum conditions, It is possible to show that a gas has been cryotrapped in, for example, condensed water vapour by detecting the subsequent release of the entrapped gas upon the heating of the condensed water vapour to a temperature, typically 160–200° K, at which the water remain frozen. This can be done, for example, using a mass spectrometer. The phenomenon of "cryotrapping" is now well known in the field of vacuum technology.

Cryotrapping can be carried out using an absorbent storage medium, such as the above-mentioned zeolites or activated carbon. (The use of an absorbent medium is not essential, however, and cryotrapping may be performed by entrapping a gas in a condensing vapour in the absence of an absorbent storage medium.) Where a gas with a low boiling point, for example such as hydrogen or argon, is cryotrapped into an absorbent storage medium by condensing water vapour, the hydrogen or argon is trapped in the condensed water vapour during the process of condensing the water vapour. Water has a lower vapour pressure than either hydrogen or argon, so that the pores of the storage medium will be preferentially filled with water-ice rather than with hydrogen or argon. The capacity of the storage medium to store hydrogen or argon is thus severely restricted This method is therefore unsuitable for the large-scale storage of gases such as hydrogen.

WO 00/01980 describes a method of storing a gas. The gas to be stored is liquefied, and is then absorbed onto an absorbent medium such as activated carbon. The absorbent medium is then encapsulated, for example using water-ice as an encapsulant.

The method of WO 00/01980 is unsuitable for commercial storage of gases having a low boiling (liquefaction) temperature, since the method requires that the gas to be stored is liquefied. For example, storing hydrogen gas by the method of WO 00/01980 would necessitate cooling the hydrogen gas to −252°C. in order to liquefy the hydrogen gas, and this would be very expensive In practice, cooling hydrogen gas to −252° C. would entail the use of liquid helium (boiling point: −269° C.) as a refrigerant. The need to use liquid helium would require special cryogenic apparats, and this would be expensive to provide and maintain. Liquid helium itself is also expensive.

It would therefore be very cumbersome and expensive to store hydrogen gas using the method of WO 00/1980, so that WO 00/1980 does not provide a commercially acceptable method of storing hydrogen gas.

SUMMARY OF THE INVENTION

A first aspect of the present invention provides a method of storing gas comprising the steps of: absorbing gas onto/ into an absorbent medium; and encapsulating the gas by freezing an encapsulant material onto the absorbent medium.

In this aspect of the invention gas is absorbed onto/into the absorbent medium in the absence of the encapsulant material, so that the encapsulant material does not compete with the gas to fill the pores of the absorbent storage medium. In consequence the pores of the absorbent medium are filled with the gas to be stored not with the encapsulant material, and the capacity of the absorbent medium to store the gas is increased significantly, probably by orders of magnitude, compared to a conventional co-condensation/cryotrapping method.

In the invention, the gas to be stored is absorbed onto/into the absorbent medium in the gaseous state, so that it is not necessary to liquefy the gas to be stored. Encapsulating the gas increases the maximum temperature at which the gas can be kept without release of the gas. The invention thus provides an improved method of storing a gas, in particular of storing a gas having a low boiling point.

A second aspect of the present invention provides a method of storing and releasing gas comprising the steps of: storing gas by a method as defined above; and increasing the temperature of the stored gas to a temperature at which stored gas is released through the frozen encapsulant material.

A third aspect of the present invention provides a stored gas comprising a gas-charged absorbent medium; and an encapsulant layer encapsulating the absorbent medium, the encapsulant layer having been formed by freezing an encapsulant material.

Preferred features of the present invention are set out in the dependent claims.

BRIEF DESCRIPTION OF THE FIGURES

Preferred embodiments of the present invention will now be described by way of illustrative example with reference to the accompanying figure in which.

DETAILED DESCRIPTION

Figure 1:
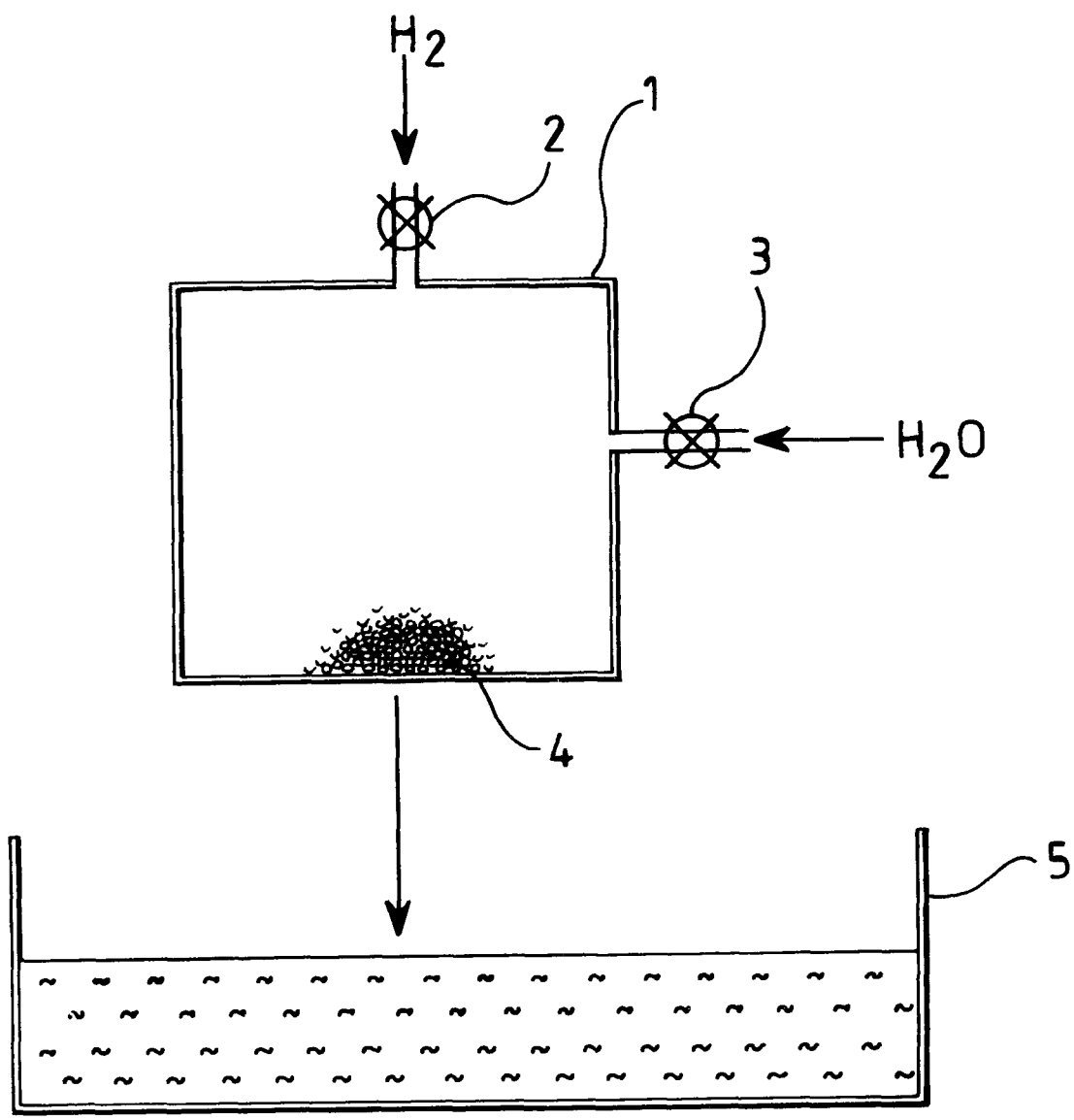
FIG. 1 is a schematic view of an apparatus suitable for performing a method of the present invention.

According to the present invention, a gas to be stored is initially absorbed into/onto an absorbent storage material, such as activated carbon, a zeolite, or other suitable absorbent material. In one embodiment this is done by cryosorption of the gas into the absorbent material. In the present invention, the cryosorption of the gas to be stored is carried out in the absence of a condensing gas such as water. Thus, the gas to be stored does not have to compete with a condensing gas to fill the pores of the absorbent storage material, and the storage capacity of the absorbent material will be taken up solely by the gas to be stored.

In the absence of any further processing of the absorbent material, when the refrigerant used to perform the cryosorption step were removed the cryosorbed gas would tend to desorb and exert its normal vapour pressure in an enclosed container. For hydrogen, the vapour pressure is one atmosphere at 20° K, 9.5 atmospheres at 31° K, and many atmospheres at 78° K. Thus, to store commercially useful quantities of, for example, hydrogen in the pores of an absorbent material, the storage temperature would conventionally have to be maintained at a very low value, and this would require expensive refrigeration equipment.

According the present invention, therefore, after the gas has been stored within the absorbent material the stored gas is encapsulated within the absorbent material. By encapsulating the stored gas, it is possible for the gas to be stored at much higher temperatures, for example up to around 2000K. Where this method of the invention is used to store hydrogen, even if the temperature of the absorbent material rises to 200° K the cryosorbed hydrogen remains encapsulated and does not desorb from the absorbent material.

One preferred method of encapsulating the stored gas is to encapsulate by freezing another material to form a capping or sealing layer around the stored gas that has been previously absorbed within the pores of the absorbent material. If the stored gas is encapsulated in this way, it is possible to perform the encapsulation in the same apparatus used to cryosorb the gas into the absorbent medium, and this simples the process.

The material used to form the encapsulating layer preferably has a higher freezing point (freezing temperature) than the gas to be stored, so that its vapour pressure at a given temperature is lower than that of the gas to be stored. This ensures that, when the temperature of the absorbent material is increased, the stored gas will desorb before evaporation of the encapsulating layer, so ensuring that the released gas is not contaminated by the material of the encapsulating layer.

One suitable material for forming the encapsulation layer is water. It has been found by the inventor that an absorbent medium that contains cryosorbed hydrogen encapsulated by water ice can be stored at temperatures up to 200° K. Moreover the absorbent material can be raised to a temperature which, while still below the melting point of water-ice, allows hydrogen gas to be released through the water-ice layer. Thus, it is possible to obtain hydrogen gas that is not contaminated by water vapour. Thus, the method of the present invention enables a gas that it is desired to store to be cryosorbed into an absorbent material at a temperature of, say, 78° K. This temperature can be readily achieved, by means of liquid nitrogen refrigerant. The absorbed gas—for example hydrogen—is encapsulated, for example with a layer of water-ice, and can then be stored at temperatures of up to around 200° K. This temperature is generally within the regime of solid carbon dioxide or household refrigerants, so that it is relatively straightforward to store the gas at this temperature. Furthermore, the absorbent material that has been processed according to the invention may be mechanically or manually manipulated in normal atmosphere or atmospheric surroundings or environment without loss of the stored hydrogen gas, and without danger of fire or explosion, provided that it is kept at or below 200° K.

For subsequent use of the stored gas, for example in a file cell, it may be controllably desorbed from the absorbent material simply by raising the temperature of the absorbent material. The temperature of the absorbent material can be chosen to provide a desired vapour pressure of the stored gas. Since the material used to encapsulate the gas has a substantially lower vapour pressure than the stored gas, the vapour pressure of the capping material during the desorption process remains at a level such that it does not contribute to or contaminate the gas stream.

The precise mechanism by which the stored gas is released through the encapsulant or capping layer is not yet fully understood. However, it has been suggested, by R. Scott Smith et at, 'Phys. Rev. Lett' Vol 79, pp909 (1997), that the release of gas trapped beneath a layer of water-ice coincides with the transformation of the water-ice from an amorphous phase to a crystalline water phase. This transformation occurs at a temperature of around 160° K, and this is close to the observed temperature at which stored gas is released under the inventor's experimental conditions.

The prior art co-condensation/cryotrapping process described above is carried out under vacuum conditions. In contrast, one feature of the present invention is that the step of cryosorbing the gas to be stored into the absorbent material is preferably cared out at a pressure in excess of atmospheric pressure, and is particularly preferably carried out at a pressure substantially above atmospheric pressure since the efficiency of the absorption process increases with the pressure of the gas.

FIG. 1 is a schematic illustration of an apparatus suitable for carrying out the method of the present invention, The apparatus primarily comprises a pressure vessel 1 that is provided with first and second inlet valves 2, 3. The valve will also be provided with other fittings that are conventionally provided in a pressure vessel such as one or more pressure gauges, a temperature measuring instrument such as a thermocouple, and an outlet valve. These fittings are not shown in FIG. 1 for clarity.

The first step is to introduce an absorbent material 4 into the pressure vessel 1. In one example, the absorbent material is 10 g of commercially available activated carbon granules (BDH 330344Y), but any suitable absorbent material can be used. The absorbent material has preferably been treated to remove any absorbed water vapour, for example by heating it.

Once the absorbent material has been introduced in the pressure vessel 1, and the pressure vessel has been sealed, the pressure vessel is then flushed to remove air from the interior of the pressure vessel. The flushing is conveniently carried out by passing hydrogen through the vessel 1 via the valve 2.

Once the vessel has been flushed, the vessel is pressurised with hydrogen gas to a pressure of 4 atmospheres absolute (that is, to a pressure 3 bar in excess of normal atmospheric pressure).

The pressure vessel is then immersed in a liquid nitrogen bath 5. This will cool the pressure vessel 1 and its contents to 78° K. The effect of this cooling is to cryosorb hydrogen gas into the absorbent material 4. The pressure of hydrogen gas within the vessel 1 falls to typically 200–300 mbar absolute. The pressure following absorption of gas into the absorbent material depends upon (a) the 'fill' pressure and the chamber volume and (b) the quantity of absorbent material. In the example cited, equilibrium is attained after approximately 2–4 minutes.

Once the cryosorption process has been completed, the valve 3 is opened to expose the absorbent material 4 to water vapour for around 15–20 minutes. During this time, a capping layer of water-ice is formed over the hydrogen gas that has been cryosorbed in the absorbent medium 4.

Finally, the pressure vessel 1 is removed from the liquid nitrogen bath (or vice versa).

In an experiment that monitors the temperature and pressure within the pressure vessel 1 when it is removed from the liquid nitrogen bath 5, it has been found that the pressure of hydrogen within the pressure vessel 1 remains unchanged until the temperature of the pressure vessel 1 has risen to around 170° K–200° K. At this point, the pressure of hydrogen within the vessel 1 rises rapidly to several bar, and this indicates that the stored hydrogen has been desorbed from the absorbent medium 4. The vapour pressure of hydrogen within the pressure vessel can be controlled by altering the temperature of the vessel, and this enables the hydrogen gas to be supplied at any desired pressure.

It is possible to reabsorb the hydrogen gas into the absorbent medium 4, by immersing the pressure vessel in the liquid nitrogen bath for a second time. It has been found unnecessary to remove the original encapsulation layer, since the gas is apparently cryosorbed through it (or possibly on it), The re-stored hydrogen gas can then be re-encapsulated by a further layer of water ice, stored and released controllably when desired.

The absorption capacity of the activated carbon at a charging pressure of 3 bar has been found to be typically 14 g.$H_2$/kg. carbon. This value is similar to those reported by other workers for activated carbons which also exhibit a linear absorption capacity for hydrogen at pressures up to 50 bar (see, for example, Amakawah et al, Int J of Hydrogen Energy" Vol 16, pp379 (1991).

The present invention is not limited to the embodiment described above, but can be varied in many ways.

For example, although the example described above uses activated carbon as the absorbent medium, the invention is not limited to the use of activated carbon. Any suitable absorbent medium can be used, including, but not limited to the above-mentioned zeolites.

In the embodiment described above, the absorption of the gas to be stored is effected by a cryosorption process. The invention is not limited to a cryosorption process, however, and the gas to be stored can be absorbed into/onto the absorbent medium by any suitable process. For example, the absorbent medium could be charged with gas at or near room temperature using a high-pressure absorption technique. It should be noted however that, regardless of the temperature at which the absorbing step is carried out, the encapsulation step must be performed at a temperature lower than the temperature at which the stored gas starts to permeate significantly through the encapsulating material. Where the invention is applied to the storage of hydrogen gas using water ice as the encapsulating material, for example, the encapsulation process must be performed at a temperature below 160–200° K (and so is most conveniently performed at liquid nitrogen temperature).

A method in which the absorption step is carried out at or near room temperature is generally similar to the method described above with reference to FIG. 1. The principal differences are that the absorbent medium would be charged with gas at or near room temperature using a high-pressure absorption technique, and that the pressure vessel 1 would not be immersed in the liquid nitrogen bath 5 until the step of charging the absorbent medium with the gas to be stored had been completed.

The invention is not limited to the storage of hydrogen gas. In principle, any gas that can be absorbed onto/into an absorbent medium can be stored by the method of the present invention. In particular, the present invention can be applied to the storage of oxygen gas.

The material used to form the capping layer is not limited to water-ice. In principle, any substance having a substantially lower vapour pressure man the vapour pressure of the stored gas, and that does not significantly contaminate the gas during its storage or release can be used to form the capping layer.

What is claimed is:

1. A method of storing gas comprising the steps of:
   a) absorbing gas onto/into an absorbent medium; and
   b) encapsulating the gas by freezing an encapsulant material onto the absorbent medium, wherein the gas is in a gaseous state during the step of absorbing gas onto/into the absorbent medium.

2. A method as claimed in claim 1 wherein step (a) comprises cryosorbing gas into the absorbent medium.

3. A method as claimed in claim 2 wherein step (a) comprises cryosorbing gas into the absorbent medium at a pressure equal to or greater than atmospheric pressure.

4. A method as claimed in claim 2 wherein step (a) comprises cryosorbing gas into the absorbent medium at a pressure of substantially 3 bar above atmospheric pressure.

5. A method as claimed in claim 1, wherein the encapsulant material has a lower vapour pressure than the gas.

6. A method as claimed in claim 1, wherein the encapsulant material is water.

7. A gas stored by the method of claim 6.

8. A method as claimed in claim 1, wherein the gas is hydrogen gas.

9. A gas stored by the method of claim 8.

10. A method as claimed in claim 1, wherein the gas is oxygen gas.

11. A gas stored by the method of claim 10.

12. A gas stored by the method of claim 1.

13. A method of storing and releasing a gas comprising the steps of:

storing a gas by a method as defined in claim 1; and increasing the temperature of the stored gas to a temperature at which stored gas is released through the frozen encapsulant material.

14. A method of storing and releasing a gas as claimed in claim 13 wherein the temperature of the stored gas is selected such that substantially no release of the frozen encapsulant material occurs when stored gas is released.

15. A method of storing and releasing a gas as claimed in claim 13 and comprising the step of varying the temperature of the stored gas thereby to vary the vapour pressure of the released gas.

* * * * *